Dec. 5, 1961  J. C. ELSKEN  3,011,647
CENTRIFUGAL SEPARATOR
Filed Sept. 30, 1957
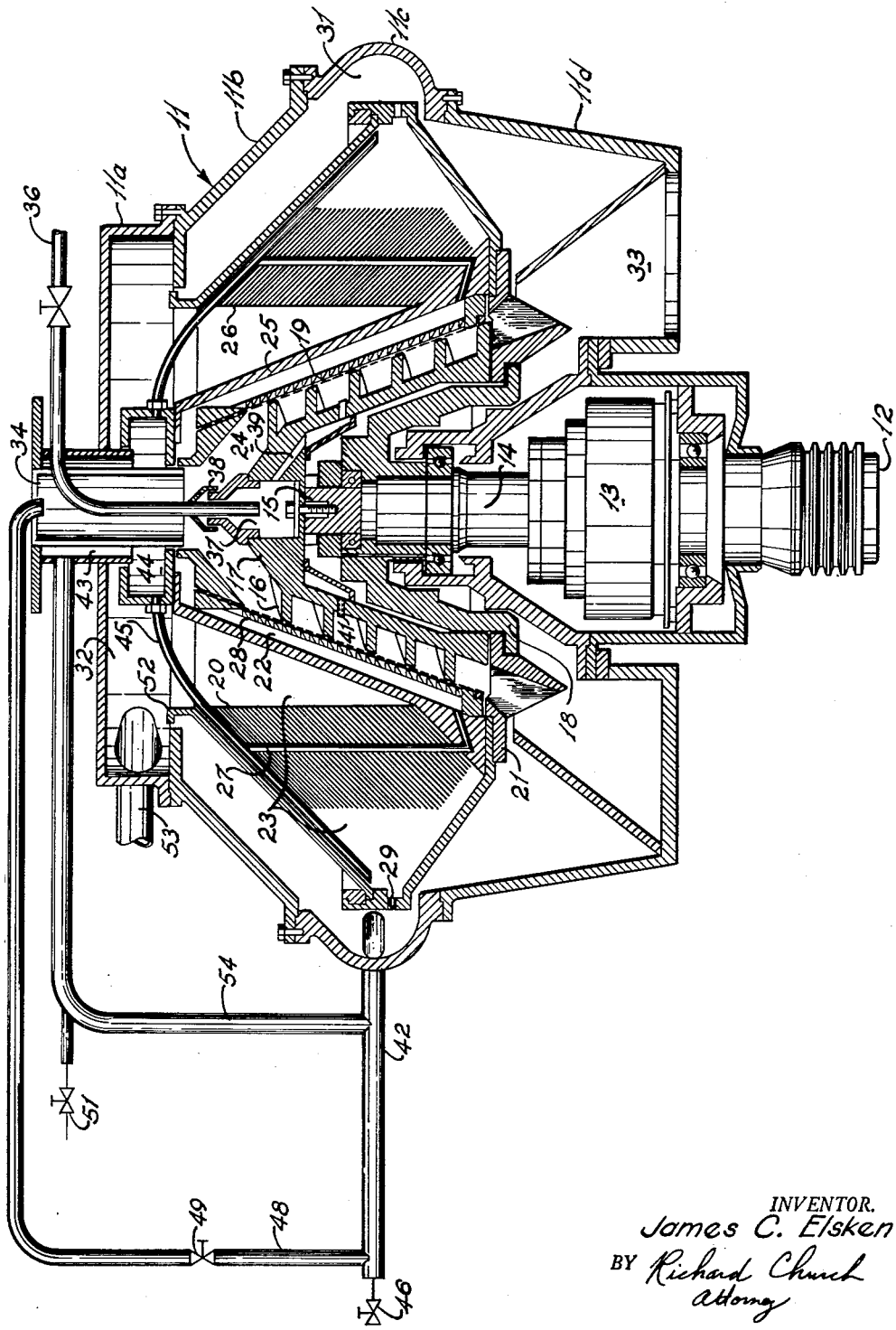
INVENTOR.
James C. Elsken
BY Richard Church
Attorney 3,011,647
CENTRIFUGAL SEPARATOR
James C. Elsken, Stamford, Conn., assignor to Dorr-Oliver Incorporated, Stamford, Conn., a corporation of Delaware
Filed Sept. 30, 1957, Ser. No. 687,260
6 Claims. (Cl. 210—374)

This invention relates to the continuous centrifugal separation of solids and liquids. More particularly, this invention relates to continuous centrifugal treatment of liquid-solid slurries whereby both a highly clarified liquid overflow fraction and a deliquified solids underflow fraction are obtained.

In many centrifugal process applications both a dry solids discharge and a clear liquid effluent are desired. To achieve this result, however, it is generally necessary to include several separating stages and to utilize a different type of centrifugal separator in each stage. For example, while a disc type bowl centrifuge may advantageously be used to produce a highly clarified effluent, the resulting solids underflow is high in liquid content. On the other hand, a rotating screen type centrifuge will produce a solids underflow low in liquid content, but the liquid overflow fraction is not very clear.

It is, therefore, the object of this invention to provide means for the efficient continuous separation of liquid-solid slurries.

It is a further object of this invention to provide means for the continuous centrifugal separation of liquid-solids slurries whereby the liquid overflow fraction is highly clarified.

It is yet another object of this invention to provide means for the continuous centrifugal separation of liquid-solids slurries whereby the solids underflow fraction is greatly dewatered.

It is still another object of this invention to provide means for the continuous washing of solids separated from liquid-solids slurries.

A still further object of this invention is to provide means by which the advantages of both a disc type bowl centrifuge and a rotating screen type centrifuge may be gained and the disadvantages of both may be mostly eliminated.

Briefly, the objects of this invention are achieved by the novel combination of a disc type bowl centrifuge and a rotating screen type centrifuge in a single unit. Provision is also made for recycling a certain portion of the solids underflow fraction to improve operating efficiencies of the separator.

In order that it may be more clearly understood, the invention will now be described, by way of example, with reference to the accompanying drawing.

In the drawing:

The figure is a drawing, in partial elevation, illustrating a preferred embodiment of this invention.

The apparatus shown in the drawing is enclosed in housing 11, which, for simplicity of construction, is composed of volute housing 11a, side wall 11b, volute housing 11c and bottom member 11d. The interior of housing 11 is divided into two functional parts: a centrifugal screen separating chamber 24 and a surrounding disc separator chamber 23.

The primary elements within screen separator chamber 24 are a helical screw 16, a frusto-conical screen 19 and a support member 28 for screen 19. Support member 28 is suitably slotted or perforated to allow drainage from screen 19. Member 17 supports helical screw 16 and such member is mounted for rotation on shaft 15. Provision is made to allow axial adjustment of member 17. Screen 19 and support member 28 are attached by cone base 21 to a yoke 18. Yoke 18 is keyed to outer shaft 14 by which means screen 19 and support member 28 may be rotated.

Conduit 34 is the feed passage or feed inlet well for introducing material to be treated into screen separator chamber 24. Passage 33 provides for the discharge of solids from rotating screen 19.

Additionally, screen separator chamber 24 is provided with a conduit 36, axially mounted within feed conduit 34, to provide wash water to screen 19 via chamber 37, drilled passages 39, and openings 41. Sealing means 38 prevent admixture of wash water in chamber 37 and the feed material entering through conduit 34.

Screen separating chamber 24 is in communication with disc separator chamber 23 via chamber 22 and feed tubes 27. Within disc separator chamber 23, disc elements 20 are securely positioned by vanes 26 and vane support member 25. The housing of disc separator chamber 23, as are screen 19 and support member 28, is attached for rotation to outer shaft 14 by means of yoke 18 and cone base 21.

Disc separator chamber 23 contains underflow discharge orifices 29 and overflow lip 52. Underflow volute 11c is provided with a discharge conduit or pipe 42, valved as at 46. Conduit 42 communicates with chamber or inlet well 43 via conduit or return pipe 54. Also conduit or return pipe 48 valved as at 49 communicates between conduit 42 and feed conduit or feed inlet well 34. Valve 51 allows introduction of wash water into conduit 54.

Inner shaft 15 and outer shaft 14 are driven by gear box 13. Gear box 13 is, in turn, driven by shaft 12 which is powered by a suitable mechanism not shown in the drawing.

In operation drive shaft 12 is brought up to operating speed and, acting through gear box 13, causes outer shaft 14 and inner shaft 15 to revolve at slightly differing speeds. For example, inner shaft 15 may be rotated at about 2,862 r.p.m. and outer shaft 14 may be revolved at about 2,800 r.p.m.

As previously noted, rotation of our shaft 14 will cause disc separator chamber 23, screen 19 and support member 28 to revolve. Also rotation of inner shaft 15 will cause helix 16 to revolve. Feed slurry is introduced into screen separator chamber 24 via conduit 34 wherein a rotational moment is imparted to the slurry. The resulting centrifugal forces cause the feed slurry to be thrown outward and against screen 19. Slurry liquid and the finer particles pass through screen 19 and support member 28 into chamber 22 while the heavier solids content of the feed slurry are retained on screen 19. As helix 16 is rotated at slightly differing speeds than screen 19, the resulting relative motion between helix 16 and screen 19 causes solids retained on screen 19 to be gently forced to ultimate discharge at chamber 33.

As previously noted, wash water may be supplied to the solids collected on screen 19 by means of conduit 36, chamber 37, drilled passages 39 and openings 41. Such washing may be advantageously employed when either a cleansed filter cake is desired or the liquid content of the feed slurry is of value.

The liquid content and finer solids of the slurry feed pass through screen 19 into chamber 22 from whence they enter feed tubes 27 and are conducted to the interior disc separator chamber 23 by the action of centrifugal force.

The centrifugal forces within disc separator chamber 23 cause the solids content of the material therein to be forced to the outer periphery of disc separator chamber 23 and to be discharged via orifices 29 into volute chamber 31. Conversely, the lighter fraction, that is to say the clarified liquor, is displaced by the heavier solids fraction toward the axis of disc separator chamber 23 causing such clarified liquor to overflow lip 52 and enter overflow volute chamber 32. Conduit 53 provides means for conducting clarified liquor from volute chamber 52.

Underflow discharge orifices 29 must be of sufficient diameter to freely pass separated solids from separating chamber 23 and so prevent clogging of such orifices. For this reason an appreciable quantity of liquid may be discharged via orifices 29, particularly so when the slurry being treated in disc separator chamber 23 is low in solids content. To prevent this undesirable discharge of excess liquid with the underflow slurry, conduit or return pipe 54 is provided to return a portion of the discharged underflow to disc separating chamber 23 via chambers 43 and 44. Thus, a higher solids concentration is built up near the periphery of disc separating chamber 23 and the amount of liquid discharged via orifices 29 is accordingly reduced. The principle of this underflow recycle is disclosed, for example, in U.S. Patents 1,847,751, 1,923,454 and 2,060,236. Wash liquid may be introduced into the return underflow conduit 54 via a conduit valved as at 51. This liquid provides for the countercurrent washing of solids within separating chamber 23.

Return conduit 48, valved as at 49, is provided to conduct discharge underflow slurry from disc separator chamber 23 and into feed passage 34. By so recycling these underflow slurries, they are again subject to treatment within the centrifugal screen separator chamber 24. While solid particles contained in this underflow slurry have initially passed through the interstices of rotating screen 19, some will be retained in successive passages through such screen separator chamber due to the filtering action of the cake built up on rotating screen 19. Thus, by recycling underflow slurry from the disc separator section of the centrifugal separator, a greater percentage of solids initially contained in the feed slurry will be recovered as a dry solids product.

In most instances, the entire portion of the underflow discharge from the disc separator section 23 of the centrifuge, with the exception of that amount recycled to the disc separator section 23 via conduit 54, may be recycled to feed passage 34. After a period of continuous operation an equilibrium is established within the system and the circulating load being returned via conduit 48 becomes constant.

When treating some slurries, however, it is possible that either no equilibrium will be reached in regard to the recycled solids, or that the equilibrium reached will be at a point where the circulating load of fine solids is so great that the efficiency of the separating device is materially reduced. In these instances, valve 46 is opened and a controlled portion of the underflow fraction discharged from disc separating chamber 23 is drawn off. Also valve 46 may be opened when it is specifically desired to have three end products, namely: deliquified solids which discharge at 33, clear effluent liquid which discharges via conduit 53, and an intermediate heavy slurry containing the finer solids fraction which discharges via valve 46. In any instance, however, a very minor fraction of the material being treated need be discharged via valve 46. Usually it will be discharged to waste unless, as previously noted, there is a specific use for this intermediate fraction.

From the foregoing description, it may readily be seen that solids low in moisture content are discharged at 33 from rotating screen chamber 24 by the action of helix 16. Also, a highly clarified liquid effluent is discharged at 53 from the disc separator chamber 23. Thus, through the practice of this invention, a liquid-solids slurry may be treated in a single device to yield a clarified liquid product and a dry solids product without using multi-unit devices presently necessary to achieve these results.

In the claims:

1. Apparatus for effecting the continuous centrifugal separation of solids from liquids, comprising in combination, a centrifugal bowl providing an annular separating chamber and having peripherally disposed underflow discharge nozzle means for delivering a solids fraction, as well as overflow means for a liquid fraction; a centrifugal screen arranged within said bowl for rotation therewith about a common axis, and having its inlet end at the overflow end of the bowl and its discharge end opposite thereto; feed means for introducing feed suspension into the interior of said screen, whereby liquid carrying a solids fraction passing through the screen undergoes centrifugal separation in said bowl into said underflow and overflow when bowl and screen rotate together; means for continuously discharging solids retained by said screen; housing means wherein said bowl is mounted for rotation to receive said underflow from said nozzle means; first transfer means for returning a first partial stream of underflow material back into the bowl for delivery to said nozzle means; second transfer means for returning a second partial stream of underflow material for retreatment back to said screen; and control means operatively associated with said transfer means and operable for varying and adjusting the flow rates of said first and second streams of underflow material in a complementary manner relative to each other whereby a decrease in the flow rate of the one is accompanied by a corresponding increase in the flow rate of the other and vice versa, and whereby the degree of clarity of the overflow product and the degree of dryness of the screen product are respectively controllable.

2. The apparatus according to claim 1, wherein a stack of separating discs is provided in said annular separating chamber.

3. Apparatus for effecting the continuous centrifugal separation of solids from liquids, comprising in combination a centrifugal bowl providing an annular separating chamber, and having peripherally disposed underflow discharge nozzle means for delivering the solids fraction, as well as overflow means for the liquid fraction; a centrifugal screen arranged within said bowl for rotation therewith about a common axis, and having its inlet end at the overflow end of the bowl and its discharge end opposite thereto; feed means for introducing feed suspension into the interior of said screen, whereby liquid carrying a fine solids fraction passing through the screen undergoes centrifugal separation in said bowl into underflow and overflow when bowl and screen rotate together; means for continuously discharging solids retained by said screen; housing means wherein said bowl is mounted for rotation for receiving said underflow from said nozzle means; first transfer means for returning a first partial stream of underflow material back into the bowl for delivery to said nozzle means; second transfer means for returning a second partial stream of underflow material for retreatment back to said screen; primary control means operatively associated with said transfer means and operable for varying and adjusting the flow rates of said first stream and said second stream of underflow material in a complementary manner relative to each other whereby a decrease in the flow rate of the one stream is accompanied by corresponding increase in the flow rate of the other stream and vice versa, and whereby the degree of clarity of the overflow product is controllable; bleed-off means for discharging from the apparatus a third stream of the underflow material; and additional control means for so adjusting the flow volume of said third stream and said second stream relative to each other in a complementary manner while maintaining constant said first stream and said clarity of the overflow, that the degree of dryness of the screen product is thereby controllable, which adjustment is controllable by closing the primary control means while opening said additional control means each to a degree such that the resulting restriction in the flow volume of the second stream is equal to the increase in the flow volume of said third stream passing through the bleed-off means whereby the sum total of said second and said third stream remains the same.

4. The apparatus according to claim 3, wherein a stack of separating discs is provided in said annular separating chamber.

5. Apparatus for effecting the continuous centrifugal separation of solids from liquids, comprising in combination a centrifugal bowl providing an annular separating chamber having oppositely arranged bowl end portions with peripherally disposed underflow discharge nozzle means located intermediate said bowl end portion, overflow means for said bowl associated with one of said bowl end portions, a hollow supporting member mounted on the other bowl end portion and dividing the bowl into an annular centrifugal separating chamber and a central screening chamber surrounded by said separating chamber, flow passage means between said screening chamber and said surrounding separating chamber and located in the foot end of said hollow supporting member adjacent to said bowl end portion, an annular distributing chamber for underflow material returned thereto provided at the overflow end of the bowl and mounted on the free end of said hollow supporting member to rotate therewith, internally disposed conduit means extending radially from said underflow distributing chamber across the path of liquid moving towards said overflow means and located adjacent to said one bowl end portion for delivering underflow return material to said discharge nozzle means, a centrifugal screen provided within said hollow supporting member radially spaced therefrom to constitute therewith an annular receiving chamber, said screen having a feed receiving end near said distributing chamber and a solids discharge end opposite thereto with screen liquid discharging through said annular receiving chamber and through said passage means into said centrifugal annular separating chamber, and a stack of separating discs located in said annular separating chamber between said flow passage means and said internally disposed conduit means; housing means wherein said bowl is mounted for rotation for receiving said underflow from said nozzle means; first transfer means for returning a first partial stream of underflow material delivered from said housing means back into said bowl for delivery to said nozzle means; second transfer means for returning a second partial stream of underflow material delivered from said housing means for retreatment back to said screen; and control means operatively associated with said transfer means and operable for varying and adjusting the flow rates of said first and second streams of underflow material in a complementary manner relative to each other whereby a decrease in the flow rate of the one is accompanied by a corresponding increase in the flow rate of the other and vice versa, and whereby the degree of clarity of the overflow product and the degree of dryness of the screen product are respectively controllable.

6. Apparatus for effecting the continuous centrifugal separation of solids from liquids, comprising in combination a centrifugal bowl providing an annular separating chamber having oppositely arranged bowl end portions with peripherally disposed underflow discharge nozzle means located intermediate said bowl end portion, overflow means for said bowl associated with one of said bowl end portions, a hollow supporting member mounted on the other bowl end portion and dividing the bowl into an annular centrifugal separating chamber and a central screening chamber surrounded by said separating chamber, flow passage means between said screening chamber and said surrounding separating chamber and located in the foot end of said hollow supporting member adjacent to said bowl end portion, an annular distributing chamber for underflow material returned thereto provided at the overflow end of the bowl and mounted on the free end of said hollow supporting member to rotate therewith, internally disposed conduit means extending radially from said underflow distributing chamber across the path of liquid moving towards said overflow means and located adjacent to said one bowl end portion for delivering underflow return material to said discharge nozzle means, a centrifugal screen provided within said hollow supporting member radially spaced therefrom to constitute therewith an annular receiving chamber, said screen having a feed receiving end near said distributing chamber and a solids discharge end opposite thereto with screen liquid discharging through said annular receiving chamber and through said passage means into said centrifugal annular separating chamber, and a stack of separating discs located in said annular separating chamber between said flow passage means and said internally disposed conduit means; housing means wherein said bowl is mounted for rotation for receiving said underflow from said nozzle means; first transfer means for returning a first partial stream of underflow material delivered from said housing means back into said bowl for delivery to said nozzle means; second transfer means for returning a second partial stream of underflow material delivered from said housing means for retreatment back to said screen; primary control means operatively associated with said transfer means and operable for varying and adjusting the flow rates of said first stream and said second stream of underflow material in a complementary manner relative to each other whereby a decrease in the flow rate of the one stream is accompanied by corresponding increase in the flow rate of the other stream and vice versa, and whereby the degree of clarity of the overflow product is controllable; bleed-off means for discharging from the apparatus a third stream of the underflow material; and additional control means for so adjusting the flow volume of said third stream and said second stream in a complementary manner relative to each other while maintaining constant said first stream and said clarity of the overflow, that the degree of dryness of the screen product is thereby controllable, which adjustment is controllable by closing the primary control means while opening said additional control means each to a degree such that the resulting restriction in the flow volume of the second stream is equal to the increase in the flow volume of said third stream passing through the bleed-off means whereby the sum total of said second and said third stream remains the same.

References Cited in the file of this patent

UNITED STATES PATENTS

| 535,720 | Newhall | Mar. 12, 1895 |
| 1,991,490 | Brewer | Feb. 19, 1935 |
| 2,500,100 | Strezynski | Mar. 7, 1950 |
| 2,511,585 | Howe | June 13, 1950 |
| 2,553,936 | Patrick | May 22, 1951 |
| 2,594,445 | Kieth | Apr. 29, 1952 |
| 2,657,803 | Schutte | Nov. 3, 1953 |
| 2,685,369 | Crossley | Aug. 3, 1954 |
| 2,724,549 | Brown | Nov. 22, 1955 |
| 2,768,748 | Reinsch | Oct. 30, 1956 |

FOREIGN PATENTS

| 496,031 | Italy | June 30, 1954 |